United States Patent [19]
Cleaver et al.

[11] 3,889,356
[45] June 17, 1975

[54] METHOD OF SUPPORTING DISTRIBUTOR BLANK FOR MACHINING

[75] Inventors: Brian William Cleaver, Walsall; Alfred Rees, Birmingham, both of England

[73] Assignee: Joseph Lucas (Electrical) Limited, Birmingham, England

[22] Filed: July 5, 1974

[21] Appl. No.: 485,892

Related U.S. Application Data
[62] Division of Ser. No. 323,386, Jan. 15, 1973.

[30] Foreign Application Priority Data
Jan. 15, 1972 United Kingdom............... 2043/72

[52] U.S. Cl. ..................... 29/559; 29/190; 29/558
[51] Int. Cl. ............................................. B23q 7/00
[58] Field of Search ............ 29/559, 558, 557, 190; 269/104, 152, 155, 321 W, 321 N; 285/402, 177; 123/143 C; 200/30 A, 27 A

[56] References Cited
UNITED STATES PATENTS

| | | | |
|---|---|---|---|
| 1,593,339 | 7/1926 | Kroeger | 200/30 A |
| 2,210,141 | 8/1940 | Cornell, Jr. | 29/157 |
| 3,180,948 | 4/1965 | McCarty | 200/30 A |
| 3,389,454 | 6/1968 | Sattler | 29/558 X |
| 3,460,239 | 8/1969 | Nix | 29/559 |

*Primary Examiner*—C. W. Lanham
*Assistant Examiner*—Victor A. DiPalma
*Attorney, Agent, or Firm*—Holman & Stern

[57] ABSTRACT

A method of manufacturing and ignition distributor comprises starting with a casing blank having a hollow cup shaped body portion and integral therewith a hollow shank portion. The blank is supported for a machining operation by engaging a clamping device with each of a pair of generally diametrically opposed lugs on the casing body portion, and a further clamping device engages a disc like region provided on the blank adjacent the junction of the body portion and the shank portion.

2 Claims, 4 Drawing Figures

METHOD OF SUPPORTING DISTRIBUTOR BLANK FOR MACHINING

This invention relates to a method of manufacturing an ignition distributor, and this Application is divided from our co-pending U.S. Pat. Application No. Ser. 323386, filed 1/15/73.

A method according to the invention includes, starting with a casing blank having a hollow cup shaped body portion and an integral hollow shank portion, and supporting the blank for a machining operation by engaging clamping devices with each of a pair of generally diametrically opposed lugs on the casing body portion.

Preferably a further clamping device is engaged with a disc like region of the casing blank provided adjacent the junction of the body portion and the shank portion.

One example of the invention is illustrated in the accompanying drawings wherein.

Figure 1:
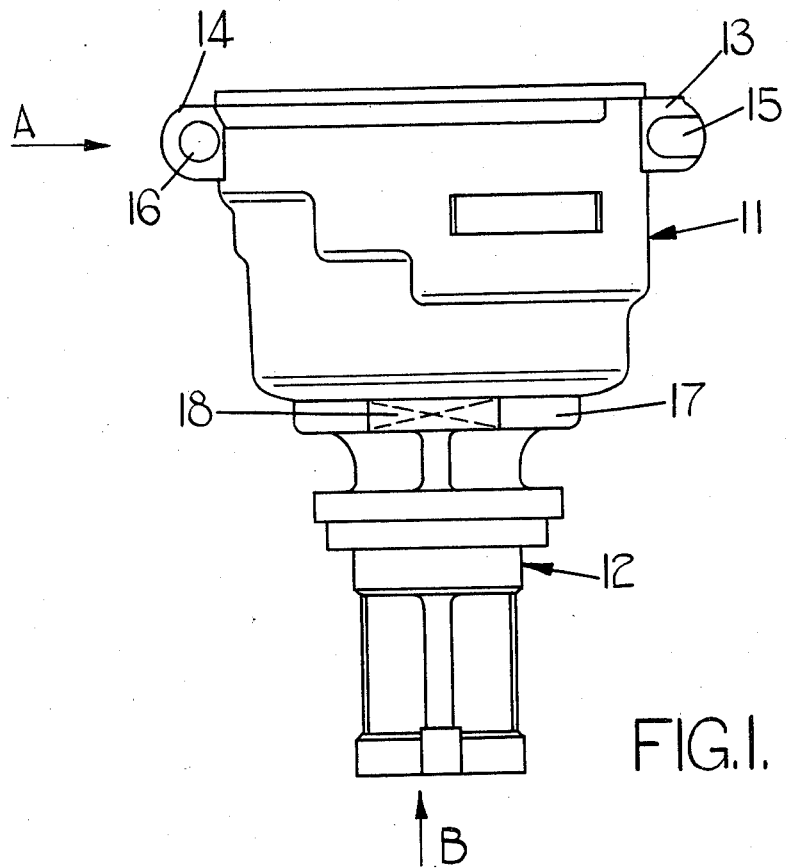
FIG. 1 is a side elevational view of the casing of an ignition distributor.
Figure 2:
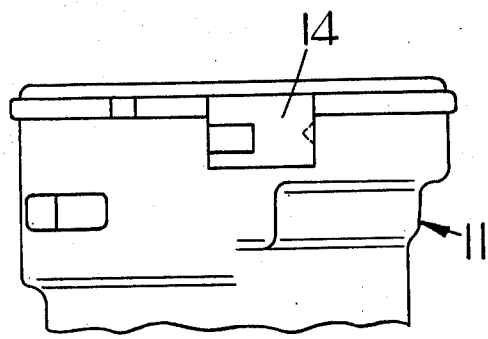
FIG. 2 is a view in the direction of arrow A in FIG. 1.
Figure 3:
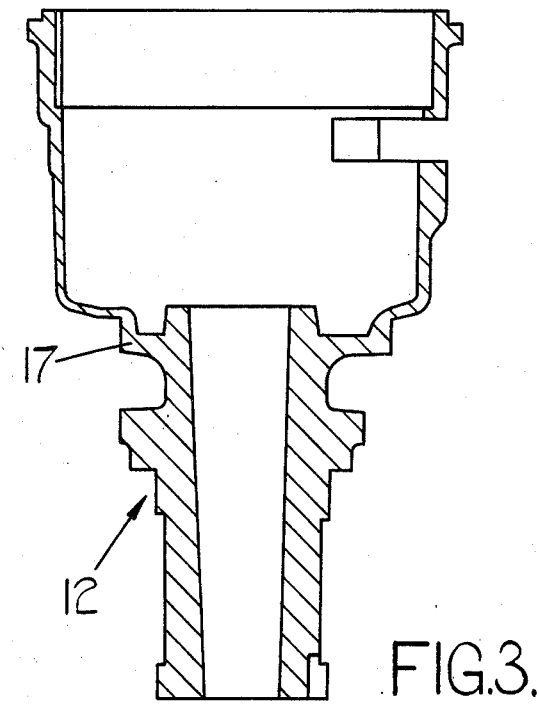
FIG. 3 is a sectional view of the casing shown in FIG. 1.
Figure 4:
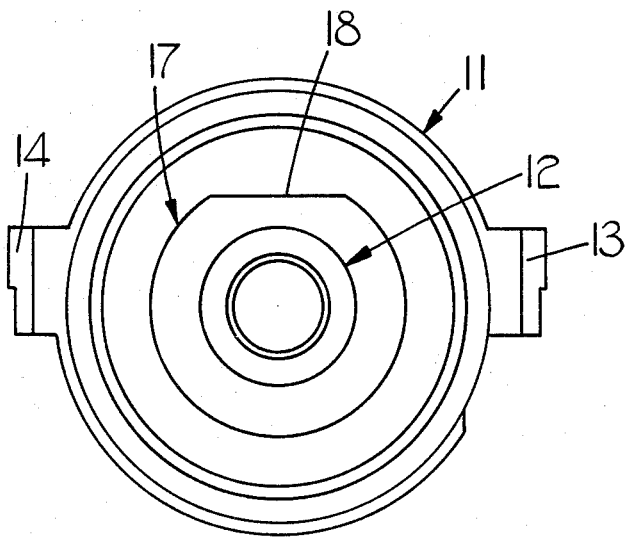
FIG. 4 is a view in the direction of arrow B in FIG. 1.

Referring to the drawings, the distributor casing includes a hollow cup shaped body portion 11 having integral therewith a generally cylindrical hollow, shank portion 12. The casing is formed by casting a casing blank, and then machining the blank to the required casing form. Thus the cast blank includes the body portion 11 and the shank portion 12. It will be appreciated, that in order to minimise weight and cost, the wall thickness of the casing is kept to a minimum. However minimising the wall thickness has attendant problems in mounting the casing blank for its subsequent machining operations in such a manner that distortion of the casing is minimal. In order to overcome this problem, the body part 11 is provided with a pair of integral, generally diametrically opposite lugs 13, 14. The lug 13 is provided, in one end face, with a groove 15 of V shaped cross-section, while the corresponding end face of the lug 14 is provided with a conical recess 16. Additionally, adjacent the junction of the body portion 11 and the shank portion 12 the casing is provided with an integral disc like portion 17. Since the shank portion 12 is hollow then the portion 17 is in fact an annulus, and the diameter of the portion 17 is so chosen that the portion contains a considerable depth of metal. The portion 17 is formed with a peripheral flat 18 the plane of which is parallel to a plane containing the lugs 13, 14.

The casing blank is mounted for machining, by engaging first and second clamping devices with the lugs 13, 14 respectively. The clamping devices each include a first jaw having a conical or part spherical form thereof which engages, in the one case in the groove 15, and in the other case in the recess 16, and a second, flat, jaw which engages the opposite end of the respective lug. The provision of the groove 15 in the lug 13 as opposed to the recess 16 in the lug 14 permits the clamping devices, which are part of a common body, to accommodate slight differences in the diameter of casing blanks. It will be appreciated, that clamping forces applied to the lugs 13, 14 can hold the casing blank rigidly, while causing minimal distortion to the thin walled body portion 11 of the blank. Additionally, a third clamping device engages the disc like portion 17 of the blank, the depth of material in the portion 17 minimising distortion of the blank owing to clamping forces exerted on the portion 17. The third clamping device comprises a first component which engages the flat 18 of the portion 17 and a second component which engages the portion 17 diametrically opposite the flat 18. The second component is in two relatively movable parts which together define a V-shaped recess in which the portion 17 diametrically opposite the flat, seats. The two parts each define one face of the V and relative movement of the two parts accommodates misalignment causing one face of the V to contact the portion 17 prior to the other face.

One jaw of each of the first and second clamping devices and one component of the third device are carried by one limb of a clamp, the other parts of the devices being carried by a second limb of the clamp and the two limbs being moved towards one another on opposite sides of the blank to clamp the blank.

An additional benefit of the three point mounting provided by the portion 17 and the lugs 13, 14 is that substantially the whole of the blank is accessible for machining, and all of the machining operations to be performed on the blank can thus be performed in a single machining sequence without necessitating transferring a partly machined casing between machines. Thus in one example the casing blank is clamped in a vertical, rotary indexing, multi-unit machine and is subject to the drilling of side holes and end holes for drainage, a rough turning and boring operation on the shank portion, a rough turning and boring operation on the body portion and then fine turning and boring operations on the shank and body portions.

The lugs 13, 14 are additionally shaped to receive the ends of respective clips for retaining the insulating cap of the distributor in engagement with the casing. The lugs are provided with undercut slots which receive cylindrical end portions of the respective clips, to mount the clips for pivotal movement relative to the casing. It will be appreciated, that in an arrangement where the lugs 13, 14 are shaped to support respective cap retaining clips then the second jaw of each of the clamping devices will be shaped so as not to damage the grooves provided in the lugs for the cap retaining clips.

We claim:

1. A method of manufacturing an ignition distributor including starting with a casing blank having a hollow cup shaped body portion and an integral hollow shank portion, and supporting the blank for a machining operation by engaging clamping devices with each of a pair of generally diametrically opposed lugs on the casing body portion.

2. A method as claimed in claim 1 wherein a further clamping device is engaged with a disc like region of the casing blank provided adjacent the junction of the body portion and the shank portion.

* * * * *